Fig. 4

INVENTORS
Ballard Jamieson
Robert Kee
BY David Robbins
ATTORNEY

Aug. 24, 1965 B. JAMIESON ETAL 3,202,042
SYSTEM FOR MEASURING SEPARATELY BACKGROUND
AND AVERAGE LINE LUMINANCE OR DENSITY
Filed Aug. 6, 1962 8 Sheets-Sheet 5

Fig. 7

INVENTORS
*Ballard Jamieson*
*Robert Kee*

BY
*David Robbins*
ATTORNEY

United States Patent Office 3,202,042
Patented Aug. 24, 1965

3,202,042
SYSTEM FOR MEASURING SEPARATELY BACKGROUND AND AVERAGE LINE LUMINANCE OR DENSITY
Ballard Jamieson and Robert Kee, Washington, D.C., assignors to the United States of America as represented by the Secretary of Commerce
Filed Aug. 6, 1962, Ser. No. 215,256
9 Claims. (Cl. 88—14)

This invention relates to a system for measuring separately the average line luminance and background luminance of opaque originals or values of background and average line density of film, both of the foregoing being images of linework or text.

Usually film is employed in copying or reproducing linework originals, such as typewritten documents or engineering drawings. To assist in determining proper exposure, one instrument, in the prior art, measures the reflected light from a fairly large area of the original. The reading obtained, however, is affected primarily by the background and fails to accord proper consideration to the line density. Thus, the reading is unreliable, and when the originals vary in quality, the operator must grade them visually on the basis of line width and contrast, and expose each category for a different value of background density. Since the human eye is readily fooled and the judgment of the operator is affected by fatigue, many systems must rely heavily on the inherent latitude of the film to compensate for exposure errors.

Accordingly, it is an object of the present invention to provide an instrument that may be used in determining the proper exposure of originals, accurately and consistently.

Another object is to provide an instrument for measuring separately the average density value of line and the value of background density in a negative or hard copy.

In accordance with the present invention, the illumination on originals being copied is varied until the average luminance of line has a predetermined value and the value of background luminance is within a desired range. The film is then exposed and the resulting negatives achieve a pre-established average line density and an acceptable background density in spite of wide density variations in the originals. An original having insufficient contrast to provide correct line and background densities at *any* exposure is readily detected and can be rejected in advance. Essentially the same technique may be used in determining the correct exposure in printing negatives.

More specifically, in one embodiment, the original is scanned to obtain a series of pulses that indicate the luminance values of the lines, which is a measure of line density. The number of pulses having magnitudes exceeding a first level and the number having magnitudes exceeding a second level are counted, and, by varying the illumination, are equalized to produce a selected average value of line luminance. The value of background luminance is then measured, and if it falls within a desired range, the film is exposed. The image in the resulting negative will then be of a predetermined average line density and will have an acceptable contrast ratio.

In the figures:

FIGS. 1 and 2 disclose a second embodiment of the present invention;

FIG. 3 is a block diagram showing the manner in which FIGS. 1 and 2 are assembled;

FIG. 6 is a block diagram showing the manner in which FIGS. 7 to 10 are assembled; and FIGS. 7 and 10 are waveforms used in explaining the second embodiment disclosed in FIGS. 1 and 2.

Figures 1, 3, 6:
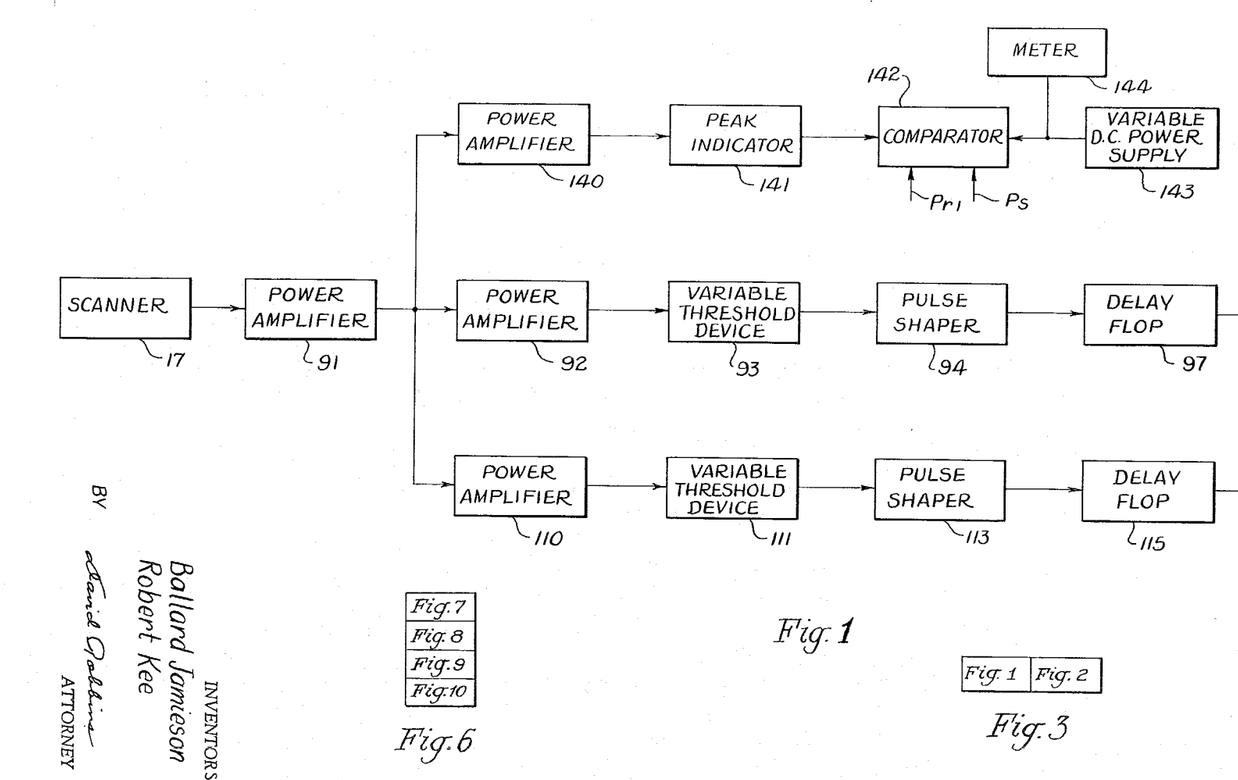
Figure 1A:
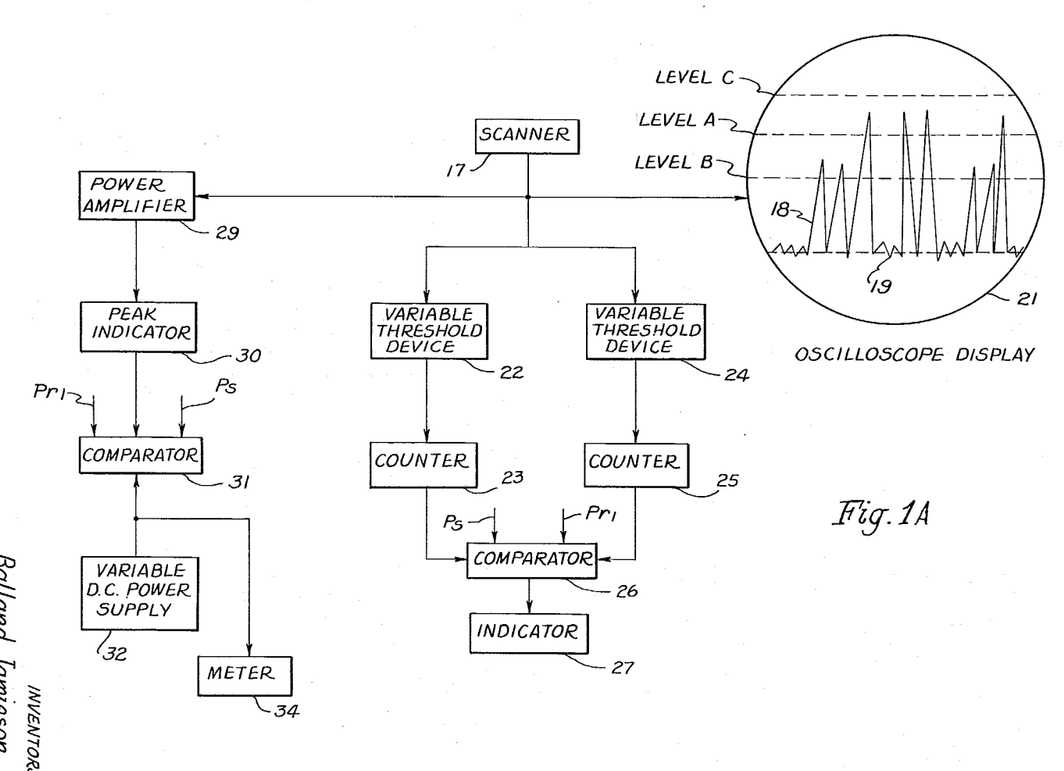
FIG. 1A discloses a first embodiment.

Referring to FIG. 1A, the output of scanner 17, which is described in detail below, comprises a waveform which includes pulses 18 and 19 and is exemplified in oscilloscope display 21.

The level of pulses 18 are dependent upon the luminance, and thus density, of the lines or text in the document to be copied. The pulses having values above level A are passed through variable threshold device 22 to counter 23, while the pulses having values above level B are passed through variable threshold device 24 to counter 25. Counter 23 counts every pulse above level A, and counter 25 counts every other pulse above level B. The output voltage of each counter has a value depending upon the number of input pulses and each output is applied to comparator 26 whose output, in turn, is applied to indicator 27. The indicator provides a reading that is a measure of the number of pulses applied to one counter relative to the number of pulses applied to the other.

The level of pulses 19 is dependent upon the luminance of the background of the document to be copied and is measured from level C shown in display 21.

Pulses 19 are applied through power amplifier 29 to peak indicator 30, which provides a substantially constant voltage having a magnitude dependent upon the peak value of the pulses. The output of the peak indicator and of variable power supply 32 are applied to comparator 31. The output of the power supply and the levels of threshold devices 22 and 24 are adjusted to values that are dependent upon such factors as the type of film and type of processing used and remain constant for each set of operating conditions for the system disclosed in FIG. 1A.

Thus, the range of acceptable background density is established by the setting of power supply 32 and the predetermined line density by the settings of variable threshold devices 22 and 24. For a given illumination on document 63 in FIG. 4, meter 34 indicates the background density and indicator 27 the line density that will be achieved when the fim is exposed.

It is understood that indicator 27 could be a neon light which is energized when a null is obtained in comparator 26. The light will then be energized to indicate that for particular operating conditions the predetermined line density will be achieved on exposure of the film and the reading of meter 34 will indicate that the background density will be within the acceptable range. Meter 34 could, of course, be provided with an additional scale to obtain a direct reading of the contrast ratio, which is the ratio of background to line density.

Figure 4:
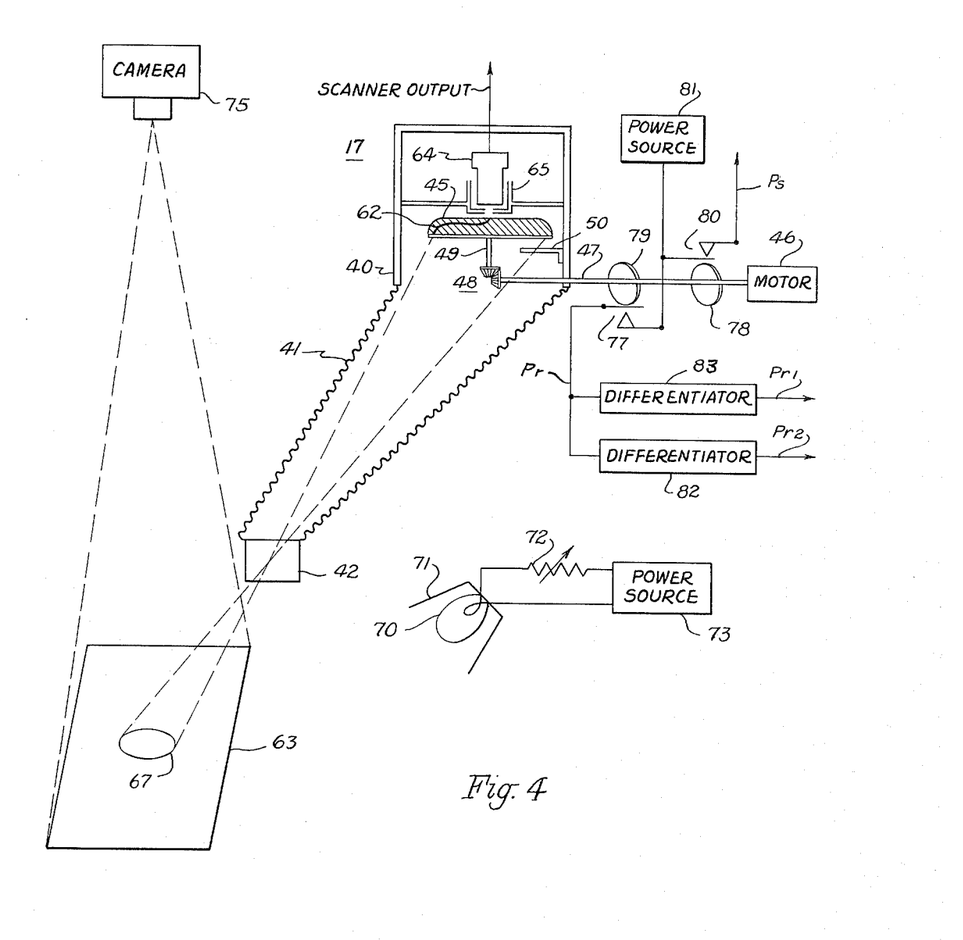
FIG. 4 illustrates a scanner used in this invention.

Referring to FIG. 4, scanner 17 includes cylindrical member 40 to which bellows 41 is attached. Lens 42 is positioned in one end of the bellows. Disc 45, composed of opaque material, is driven by motor 46 through shaft 47, bevel gears 48 and shaft 49. Blanking bar 50 is connected to member 40 by suitable means, not shown.

Disc 45 contains a perforation close to its perimeter through which fiber optic strand 62 is inserted, so that one end of the strand receives light from the image of document 63 projected by lens 42 onto the disc. The other end of the optic strand is pointed toward the center of the face of photo multiplier 64, whose output is applied in parallel to variable threshold devices 22 and 24 in FIG. 1A or to power amplifier 91 in FIG. 1. Light baffles 65 are provided to exclude extraneous light.

In a typical embodiment, lens 42 produces an image of approximately 1:1 scale, and scanning area 67 is encompassed by a circular line approximately twelve inches in circumference.

Copy light 70 and reflector 71 are positioned to illuminate document 63. The value of illumination on the document is controlled by variable resistor 72 which is connected between the light and power source 73. Camera 75 is positioned to photograph the document.

Cams 78 and 79 are positioned on shaft 47 and control contacts 80 and 77, respectively. As the cams rotate and the contacts close, power source 81 generates pulse $P_r$ and pulse $P_s$ in the time interval when fiber optic strand 62 is positioned, during its rotation, behind blanking bar 50. Pulse $P_s$ is applied to comparators 26, 31 in FIG. 1A and comparators 105, 142 in FIGS. 2 and 1, respectively, while pulse $P_r$ is fed in parallel to differentiators 82, 83 in FIG. 4. Differentiator 83 responds to the leading edge of $P_r$ to generate pulse $P_{r1}$, while differentiator 82 responds to the trailing edge of $P_r$ to generate pulse $P_{r2}$. Pulse $P_{r1}$ is applied to and resets comparators 26, 31, 105, and 142; and pulse $P_{r2}$ is applied to and resets storage devices 101, 122.

Figure 2:
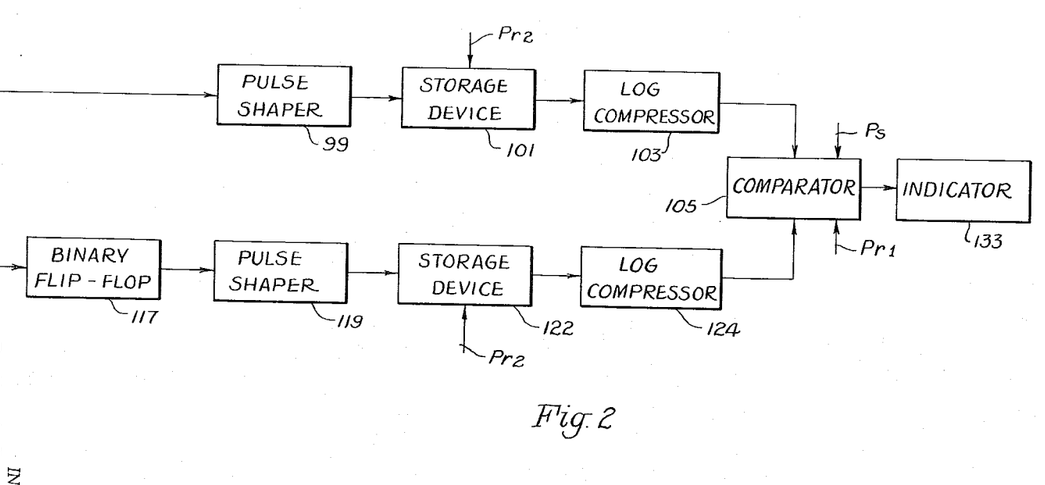

In using the embodiment in FIGS. 1A and 2 to determine the proper exposure for document 63, the operator varies the illumination by means of resistor 72 until meter 27 indicates a desired average line luminance. He then observes whether the reading of meter 34 falls within a desired range. If it does, the document is exposed and a negative is obtained with an acceptable contrast ratio and an average line density of desired value.

Figure 8:
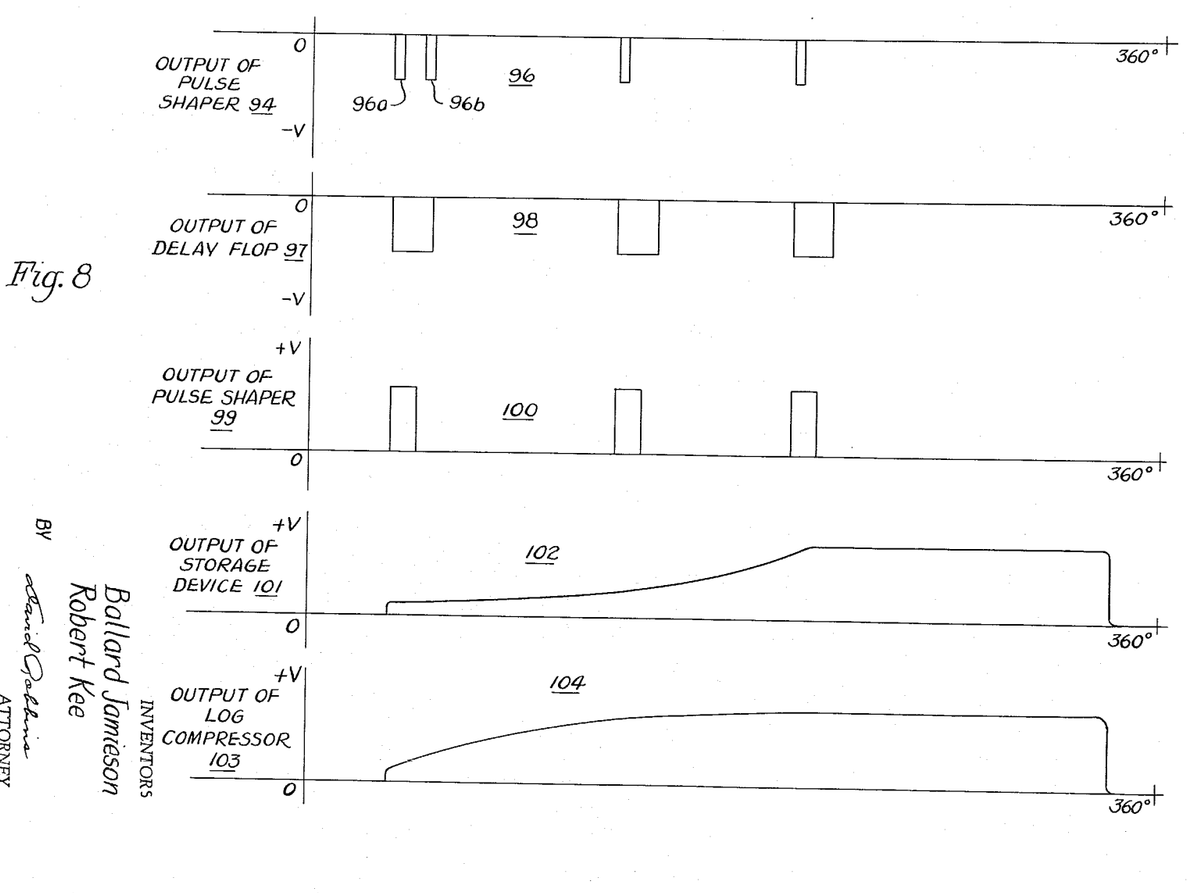

As indicated above, scanner 17 provides a circular scan, but for purposes of explanation, its scan is shown as linear in FIG. 7. During one revolution of disc 45 in FIG. 4, the scan of material 85 in FIG. 7 is represented by line 86 and the output of scanner 17 by waveform 87. Waveform 87 is amplified in power amplifiers 91, 92 in FIG. 1 and then applied to variable threshold device 93. The latter is set to pass pulses having values above level A. The output of device 93, which is the input to pulse shaper 94, may therefore be represented by pulses 95. The output of the pulse shaper is represented by square waves 96 in FIG. 8 and is applied to delay flop 97. The delay flop generates square waves 98 which are passed to pulse shaper 99, which, in turn, provides a series of pulses 100 that are fed to storage device 101. The storage device generates waveform 102 which is sent to log compressor 103 that has an output represented by waveform 104. The output of the log compressor is tied to comparator 105.

It will be noted that when scan 86 crosses a letter, a signal is generated that may include a plurality of pulses. When letter $r$, for example, in FIG. 7 is scanned, pulses 87b are generated. In this embodiment, only the first pulse in the signal will generate a pulse to be counted. Thus, pulses 87b, after passing through threshold device 93, develop square waves 96a, 96b in the output of pulse shaper 94. The leading edge of 96a triggers delay flop 97, which provides a square wave having a duration such that 96b will have no effect on the delay flop.

Figure 9:
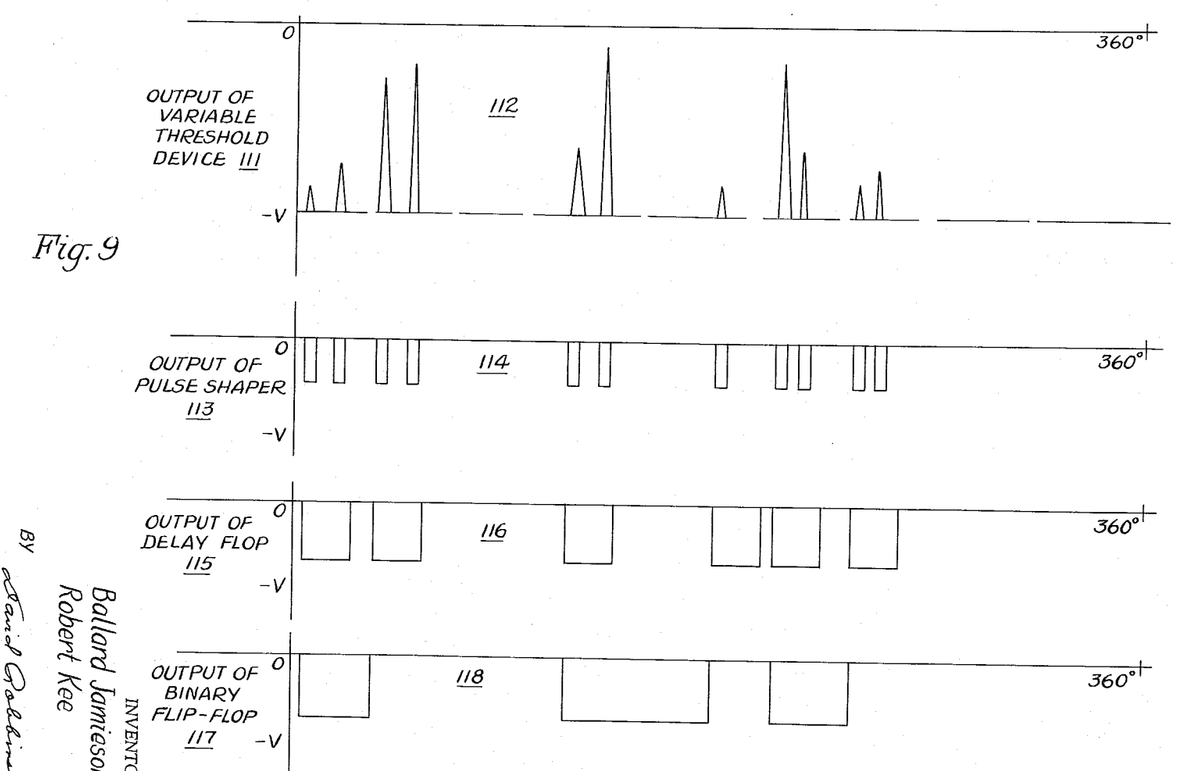

Returning to scanner 17, its output is amplified in power amplifiers 91, 110 and then applied to variable threshold device 111, which passes pulses 112 in FIG. 9 to pulse shaper 113. Pulses 112 are derived from the pulses in waveform 87 having magnitudes greater than level B. The pulse shaper 113 provides a series of square waves 114 which are fed to delay flop 115. The latter generates square wave 116 that, in turn, are applied to binary flip-flop 117. The binary flip-flop counts every other square wave since it is turned on by the leading edge of one square wave 116 and off by the leading edge of the next square wave. The output of the binary flip-flop, comprising square waves 118, is passed to pulse shaper 119 which develops a series of square waves 120 that are applied to storage device 122. The output of the storage device has a waveform 123 and is fed to log compressor 124 whose output 125 is applied to comparator 105.

The function of log compressor 103, 124 may be indicated as follows: The inputs to the log compressors, having values of $x$ and $y$, are converted to signals having values of log $x$ and log $y$, respectively, which are applied to comparator 105. In the comparator, the magnitude of the smaller signal is subtracted from that of the larger, say log $x$ is subtracted from log $y$, to provide a signal representing the ratio of $x$ to $y$. The latter signal is passed to indicator 133 which the operator may observe to determine whether the magnitudes of, and in effect the number of pulses represented by, $x$ and $y$ are equal or the degree and direction in which the magnitudes are unequal.

Returning to waveform 87 in FIG. 7, the level and number of pulses 87a are dependent upon the luminance of the background of the document containing material 85. The level of the pulses is measured from level C.

Pulses 87a are amplified in power amplifier 140 in FIG. 1 and then applied to peak indicator 141, which provides a substantially constant voltage having a magnitude dependent upon the peak values of the pulses. The output of the peak indicator is applied to comparator 142. Similarly, the output of variable D.C. power supply 143 is applied to the comparator. The output of the power supply and the levels of threshold devices 93 and 111 are adjusted to values that are dependent upon such factors as the type of film and developer used, the temperature of the developer and the time of development. The settings of the power supply and threshold devices remain constant for each set of operating conditions of the embodiment disclosed in FIGS. 1 and 2.

Accordingly, the selected range of acceptable background density is set by adjusting the magnitude of the output of power supply 143 and the predetermined line density is established by adjusting the threshold of devices 93 and 111. For a given level of illumination on document 63 in FIG. 4, meter 144 indicates the background density and indicator 133 the line density that will be achieved upon exposure of the film.

Figure 10:
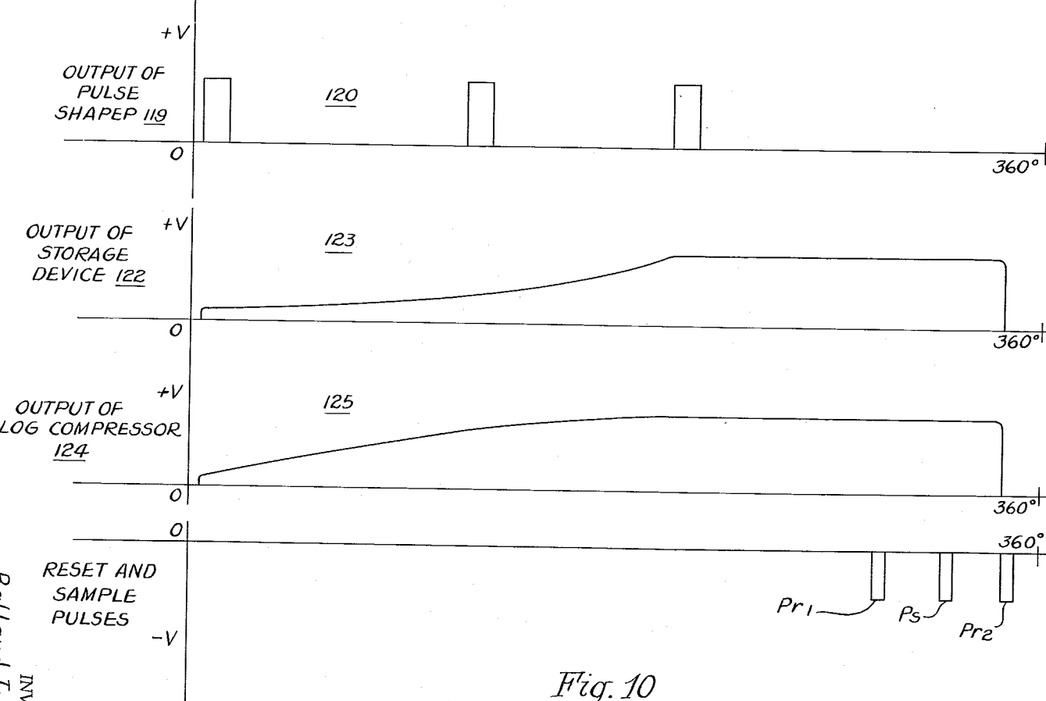

Referring to the sample and reset pulses which are generated in FIG. 4 and shown in FIG. 10, pulse $P_{r1}$ resets comparators 105, 142 in FIGS. 2 and 1, respectively; pulse $P_s$ samples the comparators; and pulse $P_{r2}$ resets storage devices 101, 122.

The operation of the embodiment in FIGS. 1 and 2 is essentially the same as the embodiment in FIG. 1A. The operator varies the intensity of copy light 70 in FIG. 4 until indicator 133 in FIG. 2 measures a desired average line luminance and the magnitude of the output of variable D.C. power supply 143 falls within a desired range. When the film is exposed and developed, the negative will have a desired contrast ratio.

Figure 5:
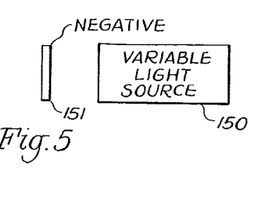
FIG. 5 discloses a third embodiment.

Obviously many modifications and variations of the present invention are possible in the light of the above teachings. For example, by positioning variable light source 150, negative 151, and the structure in FIGS. 1 and 2 in the manner shown in FIG. 5, one may determine the average line density and background density in the negative and the level of illumination and corresponding exposure required to obtain a desired contrast ratio in the print. Again, a servo drive unit could be connected to the outputs of log compressors 103 and 124 in FIG. 2. The difference in output voltages of the compressors could then be used to drive variable resistor 72 in FIG. 4, controlling the illumination on document 63 until the difference in output voltages is zero and the correct line luminance for proper exposure is read by scanner 17. It is therefore to be understood, that within the scope of the claims, the invention may be practiced otherwise than as specifically described.

What is claimed is:

1. In a system for measuring separately the average line luminance and background luminance of material, both being images of linework or text, means for illuminating said material, means for optically scanning said material, signal generating means responsive to the light output of the scanning means for providing a series of electrical pulses, first means for providing an output having a magnitude dependent upon the number of pulses in said series having a value exceeding a first selected level, second means for providing an output having a magnitude dependent upon the number of pulses in said series having a value exceeding a second selected level, said first level being greater in magnitude than said second level, and means for comparing the outputs of said first and second means.

2. The system set forth in claim 1 including means connected to the output of said signal generating means for determining the background density of said material.

3. The system set forth in claim 1 including a first and second threshold device positioned between the output of said signal generating means and the input of said first and second means, respectively.

4. The system set forth in claim 3 including means connected to the output of said signal generating means for determining the background density of said material.

5. The system set forth in claim 1 including a peak indicator connected to the output of said signal generating means, a comparator having an input connected to the output of said peak indicator, and a variable direct-current power supply connected to an input of the comparing means.

6. The system set forth in claim 1 including a first and second log compressor, each connected between an output of a respective one of said first and second means and a respective input of the comparing means.

7. The system set forth in claim 6 including a first and second threshold device positioned between the output of said signal generating means and the input of said first and second means, respectively.

8. The system set forth in claim 7 including means connected to said signal generating means for determining the background density of said material.

9. The system set forth in claim 7 including a peak indicator connected to the output of said signal generating means, a comparator connected to the output of said peak indicator, and a variable direct-current power supply connected to an input of said comparing means.

References Cited by the Examiner

UNITED STATES PATENTS

| | | | |
|---|---|---|---|
| 2,293,425 | 8/42 | Dammond. | |
| 2,641,158 | 6/53 | Sweet | 88—14 |
| 2,680,200 | 6/54 | Hercock. | |
| 2,764,060 | 9/56 | Horak | 88—14 |
| 3,074,312 | 1/63 | Olson | 88—23 |

JEWELL H. PEDERSEN, *Primary Examiner.*